(12) United States Patent
Faunce et al.

(10) Patent No.: US 8,239,406 B2
(45) Date of Patent: Aug. 7, 2012

(54) EXPRESSION TREE DATA STRUCTURE FOR REPRESENTING A DATABASE QUERY

(75) Inventors: Michael S. Faunce, Rochester, MN (US); Yasunobu Suginaka, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 12/347,091

(22) Filed: Dec. 31, 2008

(65) Prior Publication Data

US 2010/0169381 A1    Jul. 1, 2010

(51) Int. Cl.
    G06F 17/30    (2006.01)
(52) U.S. Cl. ........................................ 707/770
(58) Field of Classification Search .......... None
    See application file for complete search history.

(56) References Cited

U.S. PATENT DOCUMENTS

| | | | |
|---|---|---|---|
| 4,829,427 A | 5/1989 | Green | |
| 4,956,774 A | 9/1990 | Shibamiya et al. | |
| 5,091,852 A | 2/1992 | Tsuchida et al. | |
| 5,930,785 A | 7/1999 | Lohman et al. | |
| 6,381,616 B1 | 4/2002 | Larson et al. | |
| 6,567,804 B1 | 5/2003 | Ramasamy et al. | |
| 6,697,961 B1 | 2/2004 | Petrenko et al. | |
| 6,721,724 B1 | 4/2004 | Galindo-Legaria et al. | |
| 6,748,392 B1 | 6/2004 | Galindo-Legaria et al. | |
| 6,968,330 B2 * | 11/2005 | Edwards et al. ................ | 1/1 |
| 2003/0009446 A1 | 1/2003 | Agarwal et al. | |
| 2005/0065921 A1 | 3/2005 | Hrle et al. | |
| 2005/0097078 A1 | 5/2005 | Lohman et al. | |
| 2005/0108204 A1 | 5/2005 | Gordon | |
| 2008/0201295 A1 | 8/2008 | Praveena et al. | |
| 2008/0235181 A1 * | 9/2008 | Faunce et al. ................ | 707/2 |

OTHER PUBLICATIONS

Database Systems Query Processing cont'd, http://sky.fit.qut.edu.au/~milliner/itb_n_232/lectures/lect005wk6.ppt, downloaded Nov. 29, 2007, 34 pages.

Claussen, Jens, et al., Optimization and Evaluation of Disjunctive Queries, Knowledge and Data Engineering, IEEE Transactions on vol. 12, issue 2, Mar.-Apr. 2000 pp. 238-260.

\* cited by examiner

*Primary Examiner* — Baoquoc To
(74) *Attorney, Agent, or Firm* — Wood, Herron & Evans, LLP

(57) ABSTRACT

A method, apparatus and program product are provided for representing a database query expression including a plurality of predicates related to one another by at least one logical relation. A list of operands is generated from the database query expression, where each operand is representative of a predicate. Each operand is mapped into an operand map. A data structure is generated based upon the generated list of operands, where the data structure includes a plurality of nodes. Each node includes an operand identifier that identifies at least one operand based upon the operand map. Each node defines a first logical relation between those predicates in the database query expression that are represented by operands identified by the operand identifier for such node. The nodes are arranged relative to one another in the data structure to define at least a second logical relation among predicates in the database query expression.

27 Claims, 11 Drawing Sheets

SELECT * FROM TABLE 1 WHERE C1=4
AND (C2>6 OR C3!=8)

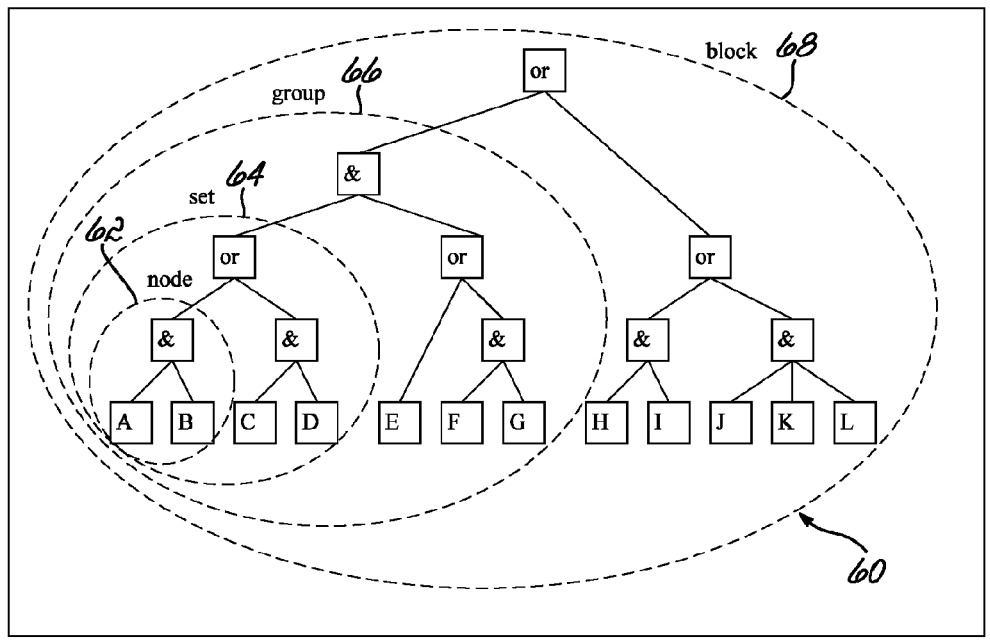

FIG. 5

| EXPRESSION | EXPRESSION TREE NOTATION |
|---|---|
| A and B | [ ( (AB) ) ] |
| A or B | [ ( (A B) ) ] |
| (A and B) or (C and D) | [ ( (AB CD) ) ] |
| (A or B) and (C or D) | [ ( (A B)(C D) ) ] |
| A and B and (C or (D and E)) and (F or (G and H)) | [ ( (AB)(C DE)(F GH) ) ] |
| A and B and (C or (D and E)) or (F or (G and H)) | [ ( (AB)(C DE) ) OR( (F GH) ) ] |
| (A and B and (C or (D and E)) or (F or (G and H))) and I and J | [ ( (AB)(C DE) ) OR( (F GH) ) AND( (IJ) ) ] |
| A and ^B (i.e., A and NOT B) | [ ( (A) ) AND-NOT( (B) ) ] |
| A or ^B | [ ( (A) ) OR-NOT( (B) ) ] |
| A and ^B and C and ^D and ^E | [ ( (AC) ) AND-NOT( (B D E) ) ] |
| | A ^B C ^D ^E = AC^B^D^E = AC^(B or D or E) |
| A or ^B or C or ^D or ^E | [ ( (A C) ) OR-NOT( (BDE) ) ] |
| | A or ^B or C or ^D or ^E = A or C or ^B or ^D or ^E = A or C or ^(BDE) |

FIG. 6

| BOOLEAN RULES | DESCRIPTION |
|---|---|
| A and (B and C) = (A and B) and C | Associativity |
| B and A = A and B, B or A = A or B | Commutivity |
| (A and B) or (A and C) = A and (B or C), (A or B) and (A or C) = A or (B and C) | Distributivity |
| A or A = A, A and A = A | Idempotency |
| A or FALSE = A, A and FALSE = FALSE, A or TRUE = TRUE, A and FALSE = A | Boundedness |
| A or ^A = TRUE, A and ^A = FALSE | Complements |
| ^(A or B) = ^A and ^B, ^(A and B) = ^A or ^B | De Morgan's laws |
| A or (A and B) = A, A and (A or B) = A | Absorption |

SELECT LAST_NAME, FIRST_NAME, TELEPHONE_NO FROM PHONE_DIRECTORY
WHERE CITY = 'Rochester' AND STATE = 'MN' AND
(LAST_NAME = 'Suginaka' OR LAST_NAME = 'Faunce')

FIG. 16

| | |
|---|---|
| S1 or S2:<br>S3 = S1 + S2 | OR-ing two sets of simple intersections results in combining all the members from both sets.<br>e.g., Expression: (A or B) results in S1: [A, B], and (C or D) in S2: [C, D].<br>Therefore S3 = S1: [A, B] + S2: [C, D] = [A, B, C, D] |
| S1 and S2:<br>S3 = S1 * S2 | AND-ing two sets of simple intersections results in distributing S2 over S1.<br>e.g., Given S1: [A, B] and S2: [C, D], S3 = S1: [A, B] * S2: [C, D] = [AC, AD, BC, BD] |
| S1 or D2:<br>S3 = S1<br>D3 = ^S1 * D2 | Results in a set of simple intersections identical to S1 and a new set of discrete intersections which is created by distributing by D2 over negated S1.<br>e.g., Expression (A or B) results in S1: [A, B], and expression (^C) in D2: [^C].<br>S3 = S1 = [A, B]<br>D3 = ^S1 * D2 = ^[A, B] * [^C] = [^A^B] * [^C] = [^A^B^C] |
| S1 and D2:<br>S3 = null<br>D3 = explode(S1) * D2 | Results in an empty set for simple intersections and a new set of discrete intersections which is S1 that is transformed to D1 (by "exploding" S1 to represent all bit patterns for the entire scope of S1) distributed over D2.<br>e.g., Expression (A or B) results in S1: [A, B] and null D1, and (^C) in = null S2 and D2: [^D].<br>Since S1: [A, B] = D1: [^AB, A^B, AB], D3 = explode(S1: [A, B]) * D2 = D1: [^AB, A^B, AB] * D2: [^C]  = [^AB^C, A^B^C, AB^C] |
| D1 or D2:<br>D3 = D1 * scope(D2) + scope(D1) * D2 | Results in a new set of discrete intersections by combining D1 distributed over an entire scope of D2 and D2 distributed over an entire scope of D1.<br>e.g., Expression A and ^B results in D1: [A^B] and ^C in D2: [^C].<br>D3 = [A^B]*scope[^C] + scope[A^B]*[^C]<br>    = [A^B][^C,C] + [^A^B, ^AB, A^B, AB][^C]<br>    = [A^B^C, A^BC] + [^A^B^C, ^AB^C, A^B^C, AB^C]<br>    = [^A^B^C, ^AB^C, A^B^C, AB^C, A^BC] |
| D1 and D2:<br>D3 = D1 * D2 | Results in a new set of discrete intersections by distributing D2 over D1.<br>e.g., Given expression (A and ^B) and (^C), D3 = D1: [A^B] * [^C] = [A^B^C] |

FIG. 15

| Header (16 bytes) | | | Directory (2 bytes per entry) | | | Data area (1 byte per node) | |
|---|---|---|---|---|---|---|---|
| ops=4 | TYPE_NONE | (counters) | Group (#1) | Set (1) | Set (1) | 0x11 | 0x07 |

FIG. 17A

| Header (16 bytes) | | | Directory (2 bytes per entry) | | Data area (1 byte per node) |
|---|---|---|---|---|---|
| ops=1 | TYPE_NONE | (counters) | Group (#1) | Set (1) | 0x01 |

FIG. 17B

| Header (16 bytes) | | | Directory (2 bytes per entry) | | | Data area (1 byte per node) | |
|---|---|---|---|---|---|---|---|
| ops=2 | TYPE_NONE | (counters) | Group (#1) | Set (1) | Set (1) | 0x02 | 0x01 |

FIG. 17C

EXPRESSION TREE DATA STRUCTURE FOR REPRESENTING A DATABASE QUERY

FIELD OF THE INVENTION

The invention relates to computers and computer software, and in particular, to representing a database query.

BACKGROUND OF THE INVENTION

Databases are used to store information for an innumerable number of applications, including various commercial, industrial, technical, scientific and educational applications. Many databases are relational databases, which organize information into formally-defined tables consisting of rows (i.e., records) and columns (i.e., fields), and which are typically accessed using a standardized language such as Structured Query Language (SQL). Database management systems (DBMS's) are the computer programs that are used to access the information stored in the databases, and to process searches, or queries, against the databases.

In general, a database query is an expression that references at least one database table in a database and includes one or more predicates connected with logical operators. Predicates that are connected with a logical operator may be referred to as the operands of the logical operator. The predicates may include an expression that references a field of the database table, multiple key values in that field, and an operator (e.g., in, etc.). The query may also include a clause that indicates that a subset of an answer set (e.g., a result table) should be returned instead of the entire answer set. To execute the query, many DBMS's perform query optimization, in which multiple execution plans or access plans for satisfying the database query are examined by a query optimizer to determine the most efficient way to execute the query.

The query optimizer determines the best access plan for executing the query by rearranging and regrouping the predicates that constitute the query into several different logical expressions. Each logical expression is then evaluated until the most cost effective plan is obtained. Memory is required to store each logical expression and time is required to evaluate each logical expression. As the number of predicates increases, the logical expressions formed by rearranging and regrouping the predicates become more complicated. Thus, more storage is required to store the internal representation of each expression, and more processing time is required to evaluate each expression.

A data structure consisting of a truth table and a list of predicates may be used to represent a logical expression. The truth table may be generated from the list of predicates of the logical expression. The truth table typically contains N columns, one column for each predicate, and $2^N$ rows, where N is the number of predicates in the logical expression. Each row of the truth table corresponds to a different combination of logical predicate values. N result values are associated with the truth table, each result value corresponding to the value of the logical expression corresponding to the combination of predicates in a row of the truth table. The truth table may be summarized as a list of $2^N$ binary characters, which includes a binary character for each result value of the truth table.

As the number of predicates increases, the storage required to store the internal representation of each logical expression may grow exponentially because $2^N$ binary characters may be required to summarize the truth table of each logical expression. For example, when the logical expression contains 20 predicates, $2^{20}$ bits, or 128 KB, of memory may be required to represent the truth table of the logical expression. When the logical expression contains 40 predicates, $2^{40}$ bits, or 128 GB may be required to represent the truth table of the logical expression. But, to represent a moderately complex expression of 1,000 predicates, $2^{1000}$ bits, or $1.247 \times 10^{291}$ GB, is required to represent the truth table of the logical expression. Thus, the truth table model may be inadequate for efficiently representing complex logical expressions containing many predicates.

The selectivity of an expression may be estimated to aid query optimization. Selectivity may be estimated by breaking an expression into intersections, constructing a subset expression from each intersection, calculating the selectivity for each subset expression, and using the calculated selectivity of each subset expression to estimate the selectivity of the entire expression. As the expression becomes more complex, the number of intersections for the expression may be too numerous to process within a reasonable amount of time. In such cases, a subset of intersections may be evaluated to estimate the selectivity of the entire expression, allowing optimization to remain fast without sacrificing the accuracy of the estimate. A truth table may also be used to represent the logical expression for selectivity estimation. But, because of the same scaling issues associated with storing the truth table in memory, estimating the selectivity of an expression based on a truth table representation of the expression may be inadequate for complex expressions.

Therefore, a need continues to exist in the art for an improved manner for representing a database query expression.

SUMMARY OF THE INVENTION

Embodiments of the invention address these and other problems associated with the prior art by providing an apparatus, program product and method that represent a database query expression using a combination of an operand map and a data structure that inherently represents relations between predicates in the database query expression based upon the organization of nodes in the data structure. A plurality of operands may be generated from the database query expression, where each operand in the plurality of operands represents a predicate in the database query expression. Each operand is mapped onto an operand map. A data structure with multiple nodes is then generated based on the plurality of operands. Each node identifies at least one operand from the plurality based on the operand map, and each node defines a logical relation between the predicates in the database query expression that it identifies as operands. The nodes are also arranged relative to each other in the data structure to define at least one other logical relation among the predicates. By doing so, the database query may be represented accurately and efficiently, and may result in decreases in the amount of time required to run and to optimize a query.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a graph illustrating an exemplary hierarchical structure for an expression tree representation utilized by the database management system of FIG. 1.

FIG. 6 is a table that shows a variety of logical expressions as converted to expression tree notation for use in the database management system of FIG. 1.

FIG. 14 is a table showing examples of Boolean rules available for simplifying an expression in the routine of FIG. 13.

FIG. 15 is a table listing rules for creating simple and discrete intersections by combining two lists, each list including either simple intersections or discrete intersections, using the database management system of FIG. 1.

FIG. 16 illustrates an exemplary database query expression.

FIGS. 17A-17C show layouts of three expression tree data structures generated by optimization of the exemplary database query expression of FIG. 16 as evaluated by the database management system of FIG. 1.

DETAILED DESCRIPTION

Figure 1:
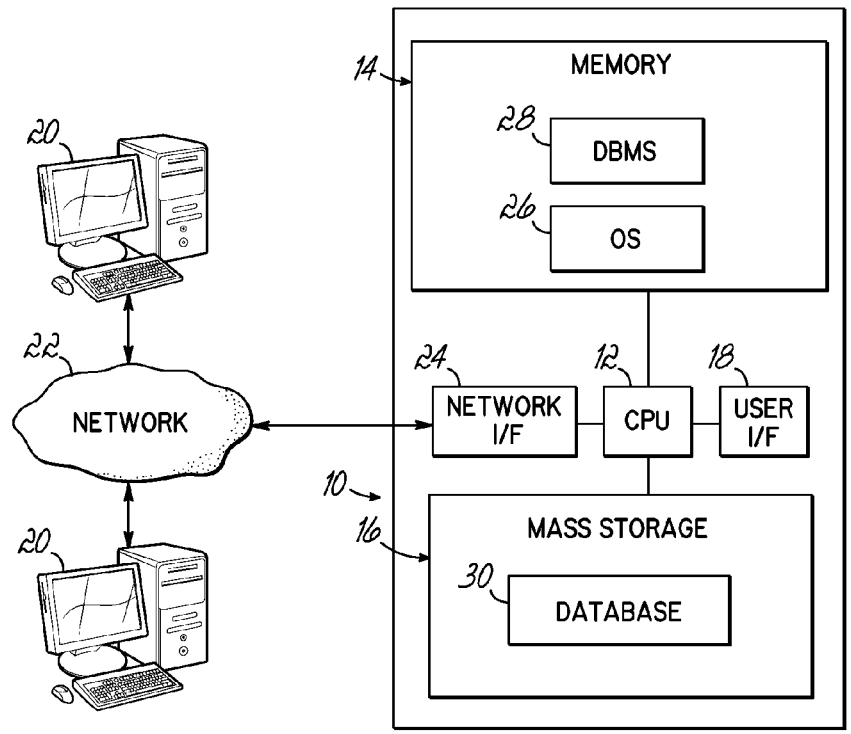
FIG. 1 is a block diagram of a networked computer system incorporating a database management system within which query optimization is implemented consistent with the invention.

The embodiments described hereinafter generate and use an expression object that includes an expression tree data structure to address deficiencies in the art associated with database query search optimization. Such embodiments represent a database query expression using a combination of an operand map and a data structure that inherently represents relations between predicates in the database query expression based upon the organization of nodes in the data structure. A plurality of operands is generated from the database query expression, where each operand of the plurality of operands represents a predicate in the database query expression. Each operand is mapped onto an operand map, and a data structure with multiple nodes is generated based on the plurality of operands. Each node in the data structure identifies at least one operand from the plurality of operands based on the operand map, and each node defines a logical relation between the predicates in the database query expression that it identifies as operands. The nodes are also arranged relative to each other in the data structure to define at least one other logical relation among the predicates.

In some embodiments, the operand map may be a binary map, and each operand of the plurality of operands may be assigned to a separate bit in the operand map, such that the operand identifier for a node is a binary value that includes a bit set for each operand identified by the operand identifier according to the binary operand map. Either the number of bits in the binary operand map, or the number of bits in the operand identifier, or both, may be based upon a number of predicates in the expression.

In some embodiments, the data structure may be an expression tree. The tree may include a header, which may include information such as the number of predicates in the tree, whether the tree is a special type, or a counter.

In other embodiments, the data structure may be a hierarchical expression tree structure made up of sets, groups, and blocks. Nodes may be contained within sets, which are contained in groups, which are contained in blocks. The tree may also include a directory in which individual entries are used for each group and each set within each group. The directory entries may, in some of the embodiments, also identify which nodes are within each set and each group.

In another embodiment, generating the data structure also includes simplifying the data structure, by sorting the data structure according to relation-preserving rules, then applying logical transformations to the sorted data structure to reduce its size or complexity.

The plurality of operands, the operand map, and the data structure, in some embodiments, may represent the database query expression in disjunctive normal form.

A logical relation consistent with the invention may be an operator that accepts zero, one, or two arguments and returns a truth value. A data structure consistent with the invention may include a header, a directory, and a data area, and may be well-defined such that locations in the data structure are reserved to store and convey different pieces of information. A list consistent with the invention may be a collection of stored elements that is accessible as data to be referenced by a program code in carrying out parts of a program.

Turning now to the drawings, wherein like numbers denote like parts throughout the several views, FIG. 1 illustrates an exemplary hardware and software environment for an apparatus 10 suitable for implementing a database management system incorporating database query representations consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 2:
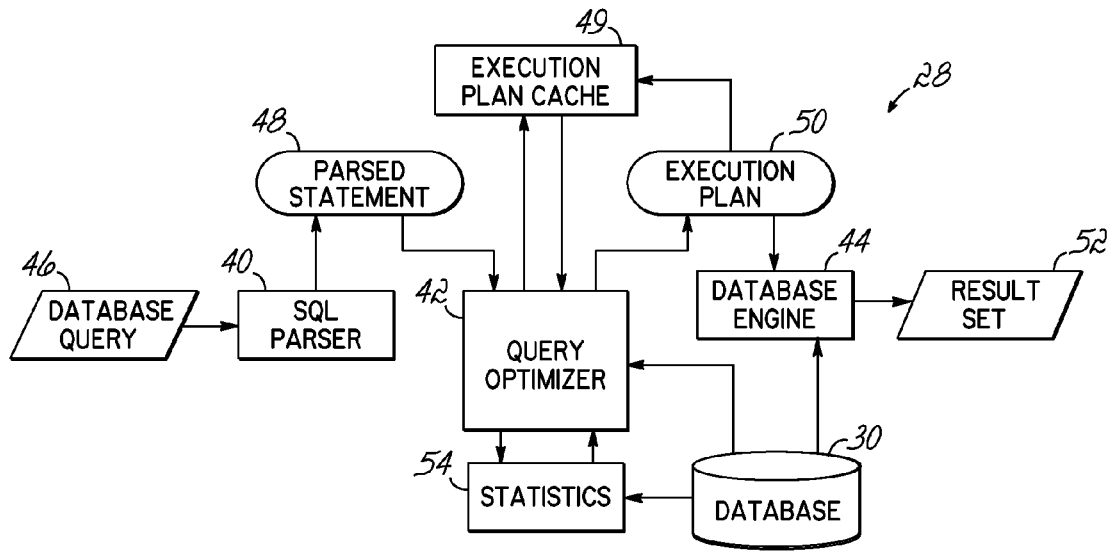
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of a SQL statement. SQL parser 40 then generates a parsed statement 48 therefrom, which is passed to optimizer 42 for query optimization. As a result of query optimization, an execution plan or access plan 50 is generated.

Once generated, the execution plan 50 is forwarded to execution plan cache 49 to be stored for future use and to database engine 44 for execution of the database query on the information in database 30. The result of the execution of the database query is typically stored in a result set, as represented at block 52. To facilitate the optimization of queries, the DBMS 28 may also include statistics 54, which may be statistical information that is gathered, created, and/or analyzed using database 30 with query optimizer 42.

The exemplary system illustrated in FIG. 1 and the exemplary implementation of DBMS 28 illustrated in FIG. 2 are not intended to limit the present invention. Indeed, those skilled in the art will recognize that other alternative hardware and/or software environments may be used without departing from the scope of the invention. For example, different functionality than that described herein may be accorded to the components consistent with the principles of the present invention.

The DBMS 28 may work on a representation of a database query expression, e.g., taking the form of an expression object, that describes the logical relations between predicates that are part of the expression. In one embodiment, each predicate is assigned a unique identification number, or UID. An expression object includes an operand list which is a list of all the predicates in the expression sorted by their UID values in a descending order, and expression tree that describes the logical relations between those predicates, as well as detailed information about expression predicate and value objects that are included in the expression as well as the interrelation and interactions between those objects, constructed as necessary. The operand list may be of any form suitable for storing the predicates in the database query expression, such as a list, an array, a map, or some other appropriate object or objects within the DBMS.

Figures 3, 4:
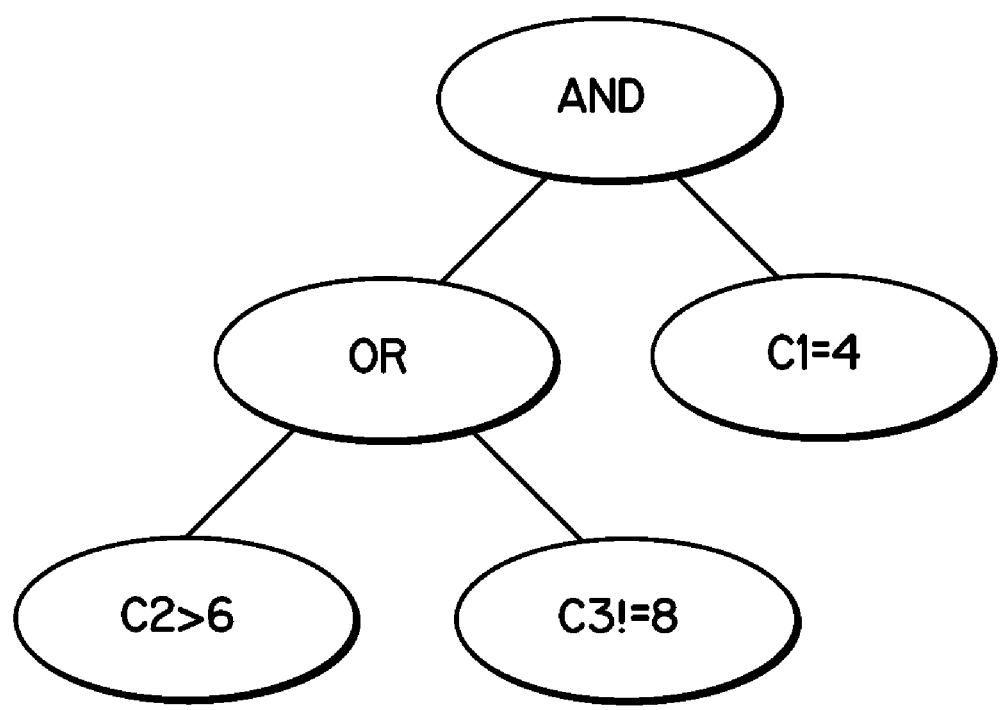
FIG. 3 illustrates an exemplary database query expression.
FIG. 4 is a graph of the query expression of FIG. 3.

Predicate expressions may include logical expressions including "AND", "OR", or "NOT"; relational expressions including "less than", "greater than", "less than or equal to", "greater than or equal to", "equals", or "does not equal"; unary expressions including "is Null", "is NotNull", "exist", or "notExist"; or even Boolean expressions such as "TRUE" or "FALSE". A sample query is shown as FIG. 3. This query may be expressed as a graph representing the three predicates "C1=4", "C2>6", and "C3!=8" along with the relations between them in diagrammatic form, and can be represented graphically as shown in FIG. 4.

In an alternate embodiment, and as illustrated in FIG. 5, the expression tree 60, which forms the basis of the expression object, is built in disjunctive normal form (DNF). By representing the expression tree 60 in this standardized form, many aspects of the relations between predicates are explicit in the expression tree structure. For the expression "(((A and B) or (C and D)) and (E or (F and G))) or (H and I) or (J and K and L)", the expression tree hierarchy includes nodes 62, sets 64, groups 66, and blocks 68 in ascending order. A node 62 may contain one or more predicates that are implicitly AND-ed together. A set 64 may contain one or more nodes 62 that are implicitly OR-ed together. A group 66 may contain one or more sets 64 that are implicitly AND-ed together. A block 68 may contain one or more groups 66 that are either AND-ed or OR-ed together. In addition to identifying whether each group 66 is AND or OR with the previous group, a group 66 may also be negated (expressed with AND-NOT or OR-NOT). Order of operation may be determined entirely by the expression tree structure in some embodiments, which allows for explicitly established relationships between multiple blocks 68, as further explained below. Other embodiments may implement the order of operations with different methods.

The table in FIG. 6 illustrates how different logical expressions might be expressed using expression tree notation. Each set 64 is represented within inner parenthesis, with a node 62 including clusters of predicates and spaces indicating separate nodes 62 within a set 64. The outer parentheses indicate a group 66, with notation in front of subsequent groups 66 to express the variable group relation. A block 68 is denoted with straight brackets. Note that negation is introduced at the group level, such that expressions that include "NOT" also include one or more separate groups 66 for the negated predicates. Note that in this embodiment of the invention, below the group level, the relationship between the nodes and sets within each group is implicitly determined by the tree structure, such that "AND" and "OR" require no explicit representation between elements within a node (always "AND"), nodes within a set (always "OR"), or sets within a group (always "AND").

Figure 7A:
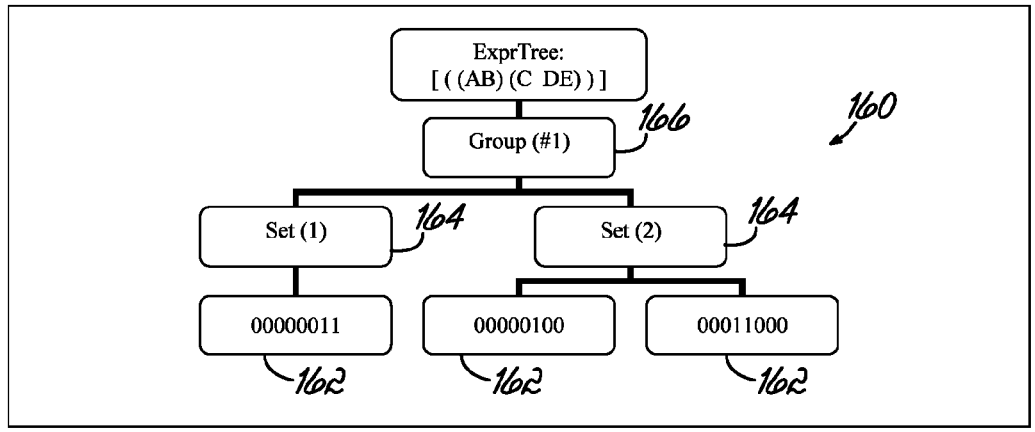
FIG. 7A is a graph showing an expression tree representation of an exemplary database query expression capable of being processed by the database management system of FIG. 1.
Figure 7B:
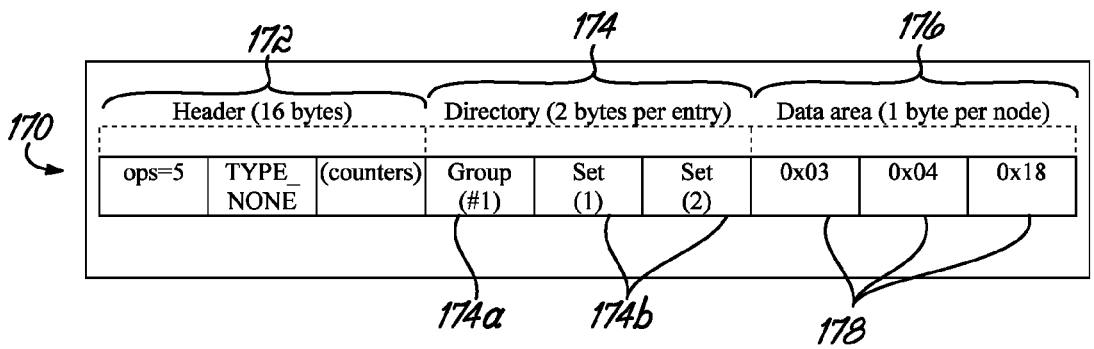
FIG. 7B shows the layout of the expression tree data structure for the expression tree representation of FIG. 7A.

Referring now to FIGS. 7A and 7B, an expression tree 160 with one group 166, two sets 164, and three nodes 162 may be implemented as a data structure 170 that includes three sections: a header 172, a directory 174, and a data area 176. The header 172 stores information such as the number of predicates, the special type, and various counters. The header 172 may occupy sixteen bytes, though other sizes of the header are also possible for other embodiments.

A directory 174 stores group and set information. The directory 174 includes two kinds of directory entries: group directory entries 174a and set directory entries 174b. Each individual directory entry 174a, 174b may occupy two bytes, thereby making the size of the directory 174 proportional to the total number of groups 166 and sets 164 in the expression tree 160. One of ordinary skill in the art will appreciate that other sizes of the directory entries may also be used in other embodiments or implementations of the data structure.

Each group directory entry specifies a block number associated with a corresponding group, an operator that adjoins the group to a previous group if any, whether the group should be negated, and the block number to which the block should be linked. For example, a group directory entry might express information equivalent to the following: AND/Group-NOT (#3) (link #1), which would indicate that the group is preceded by an AND conjunction, that the group should be negated, that the group is part of the block labeled #3, and that block #3 should link to block #1. A group directory entry may not always specify all of this information; for example, the first group in the first block of an expression tree may not include an operator, and some groups may not include a link value.

Each set directory entry may be placed serially after the group directory entry of the group that the set is a member of. The set directory entry may indicate the number of data nodes that are included in the set. For example, three directory entries might read: Group/NOT (#2), Set (5), Set (2) in order. This would imply that the first two sets in this negated group of block #2 include five nodes and two nodes, respectively.

The data area may contain an array of data nodes. In one implementation, one bit is used to represent a predicate in these nodes, and its position corresponds to the 0-based index number in the order that the predicate is stored in the operand list. For example, in an expression with eight predicates A through H, a node including "A and B and C" might read 00000111, while a node including "B and D and H" might read 10001010. No part of the data explicitly records the "and" relations in these expressions, because the "and" relationship is inherent in the representation of the three predicates as a single node. In some expressions, one predicate may appear in more than one node, but its bit position is always the same. The data node size varies depending on the number of operands. In one embodiment, the node size is selected from the group of 1, 2, 4, 8, 16, 32, 64, or 128 bytes. Where each byte accommodates up to eight predicates, a node of 128 bytes could express as many as 1,024 predicates.

The expression "A and B and (C or (D and E))", or [((AB) (C DE))] with the expression tree notation, is illustrated in FIG. 7A. FIG. 7B shows the expression tree storage layout, where the expression tree data structure 170 includes the header 172 indicating that the expression has five operands. The directory 174 includes three total directory entries to reflect the one group and the two sets. In this example, the directory 174 is six bytes and the data area 176 is three bytes. In one embodiment, where the directory 174 and data area 176 total sixteen bytes or fewer, they are stored in a single memory storage location.

FIGS. 8A-10A show additional examples of expressions as converted to expression trees 260, 360, 460 including nodes 262, 362, 462; sets 264, 364, 464; and groups 266, 366, 466. FIGS. 8B-10A show the corresponding layouts 270, 370, 470 for storing these expressions 260, 360, 460 including headers 272, 372, 472; directories 274, 374, 474 with group directory entries 274a, 374a, 474a and set directory entries 274b, 374b, 474b; and data areas 276, 376, 476 with data nodes 278, 378, 478.

Figure 8A:
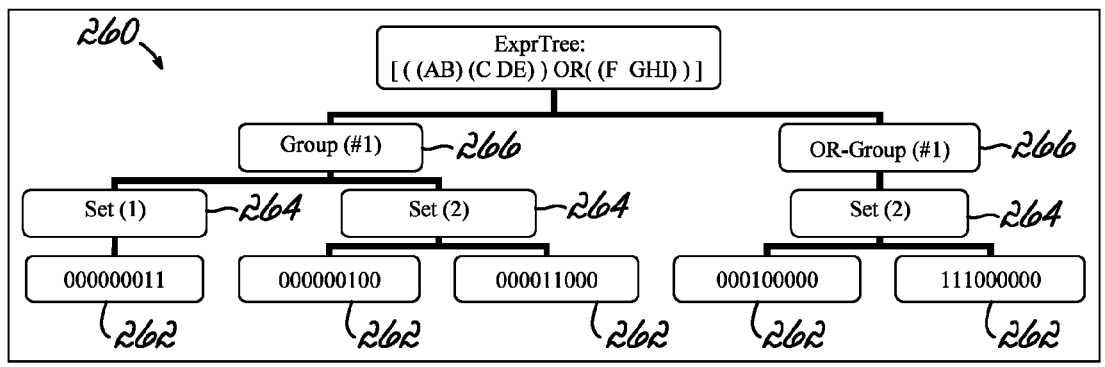
FIG. 8A is a graph showing an expression tree representation of another exemplary database query expression capable of being processed by the database management system of FIG. 1.
Figure 8B:
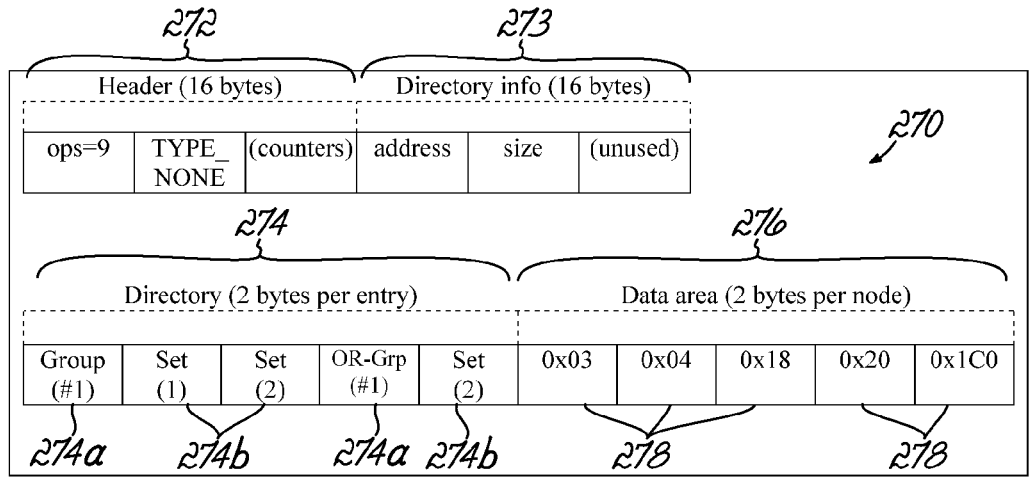
FIG. 8B shows the layout of the expression tree data structure for the expression tree representation of FIG. 8A.

FIGS. 8A and 8B show the expression tree graph and data layout of the expression tree 260 for the expression "(A and B and (C or (D and E))) or (F or (G and H and I))", which is denoted in two groups as [((AB) (C DE)) OR((F GHI))]. Where the directory and data nodes cannot collectively fit within a single sixteen-byte space, a directory info area 273 is added to the header 272 as shown, expanding the header to thirty-two bytes in size. As shown, each data node entry 276 is two bytes in order to accommodate the nine predicates A through I.

Figure 9A:
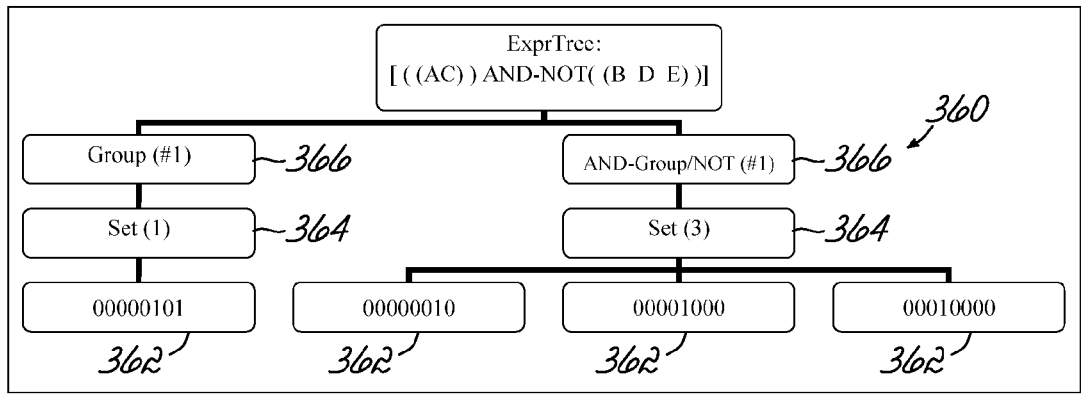
FIG. 9A is a graph showing an expression tree representation of yet another database query expression capable of being processed by the database management system of FIG. 1.
Figure 9B:
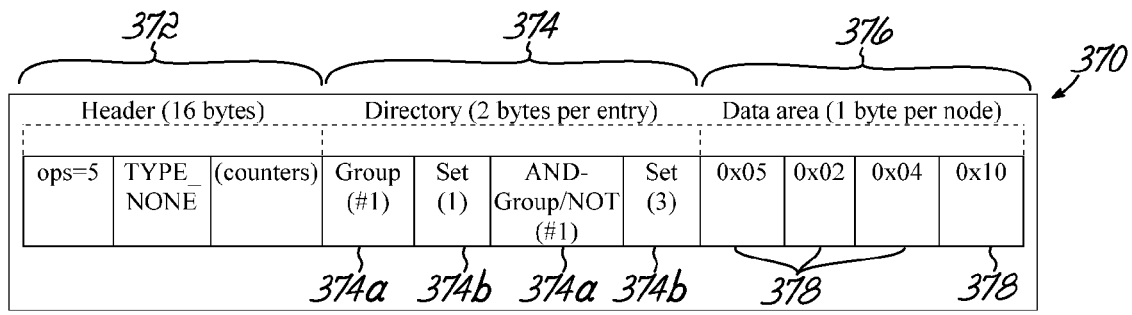
FIG. 9B shows the layout of the expression tree data structure for the expression tree representation of FIG. 9A.

As shown in FIGS. 9A and 9B, the expression: "A and ^B and C and ^D and ^E" also requires two groups 366 as some predicates are negated. Since the expression is equivalent to "A and C and ^(B or D or E)" under de Morgan's Laws, the equivalent expression tree notation is [((AC)) AND-NOT((B D E))]. Again, the directory and data area entries together total fewer than sixteen bytes.

Figure 10A:
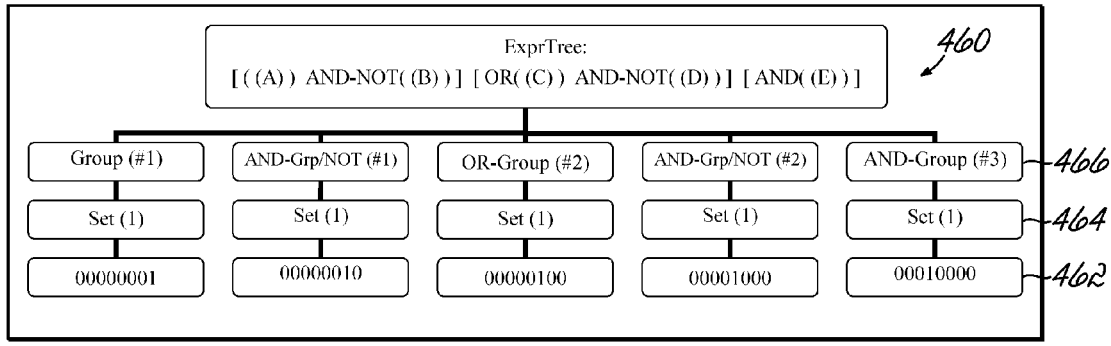
FIG. 10A is a graph showing the expression tree representation of another exemplary database query expression capable of being processed by the database management system of FIG. 1.
Figure 10B:
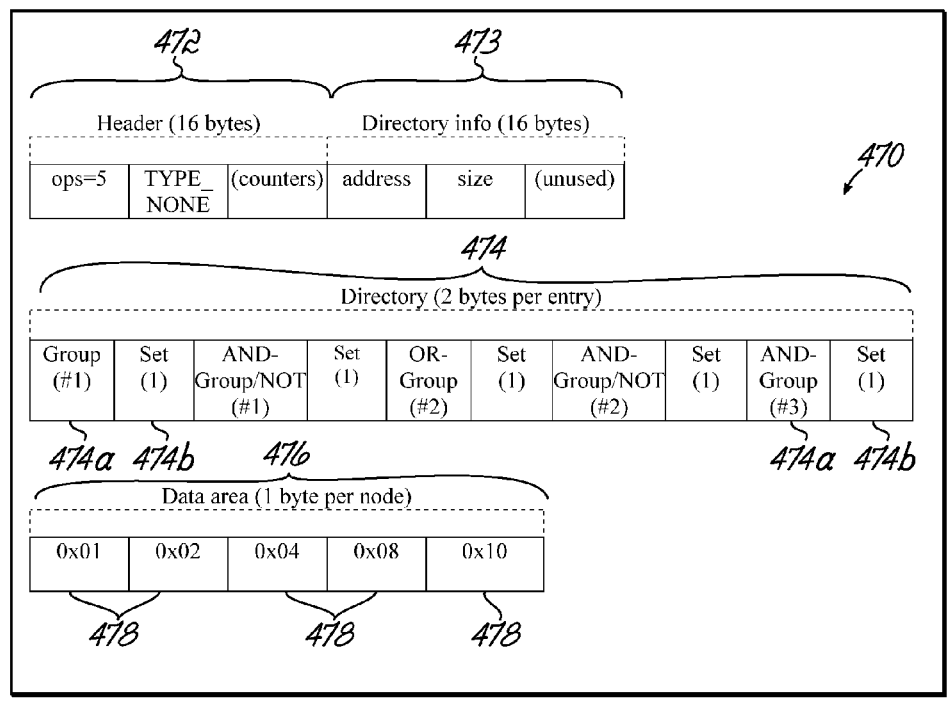
FIG. 10B shows the layout of the expression tree data structure for the expression tree representation of FIG. 10A.

FIGS. 10A and 10B show an expression tree 460 including multiple blocks 468. The expression "((A and ^B) or (C and ^D)) or E" requires multiple blocks 468 since two groups 466 with negated predicates are OR-ed. Its equivalent expression tree notation is [((A)) AND-NOT((B))] [OR((C)) AND-NOT ((D))] [AND((E))] and can be illustrated as shown, including a directory info area 473 as above.

Figure 11:
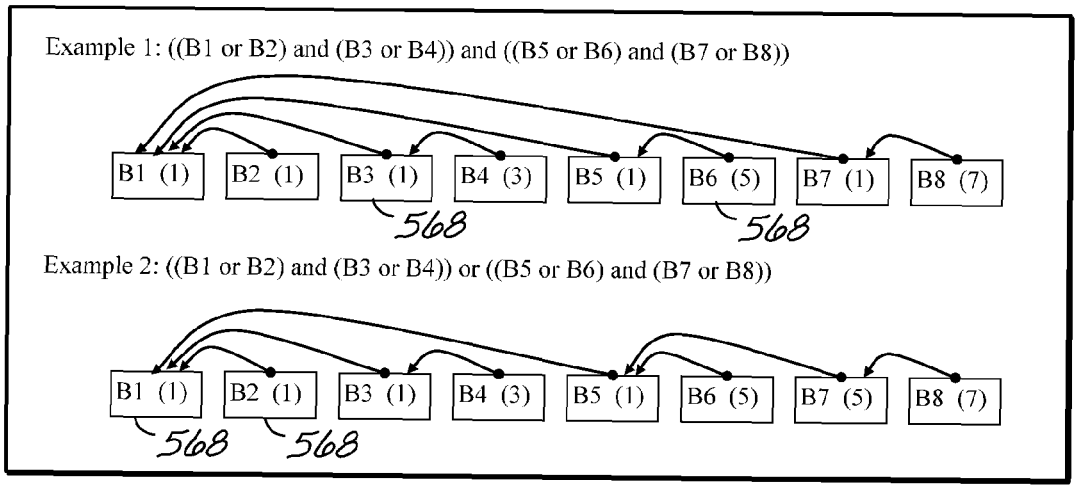
FIG. 11 provides examples illustrating the use of the link field between multiple blocks of an expression tree capable of being processed by the database management system of FIG. 1.

With use of the link field of each group directory entry, it is possible to link blocks 568 in order to properly reflect the expression being stored. As shown in FIG. 11, each block 568 may be associated with a previous block 568 in accordance with the order of operations proper for each expression. This allows expressions such as "(block #1 or block #2) and (block #3 or block #4)" to be properly denoted in the expression tree 560.

In order to save space in certain cases, the header of the expression tree may include a field for indicating a special type. These special types can simplify representation of expressions with predetermined relations. Special types may include TYPE_OR, TYPE_AND, TYPE_NOR, and TYPE_NAND, each of which denote that the list of predicates are simply joined by logical relationship OR, AND, NOR, or NAND, respectively. Additional special types may include TYPE_ALL and TYPE_CLEAR, representing Boolean true and false values, respectively. Each of these special types allows for the expression tree to include a header but not a corresponding data area, as the special type itself defines the relation between the operands. The special type TYPE_SINGLE is used where only a single bit on the corresponding truth table would correspond to TRUE, and therefore can be used with only a single data node to denote which of the operands are negated to form the single TRUE value (for example, the node 0101 used to represent "A and ^B and C and ^D" with a TYPE_SINGLE marker).

Figure 12:
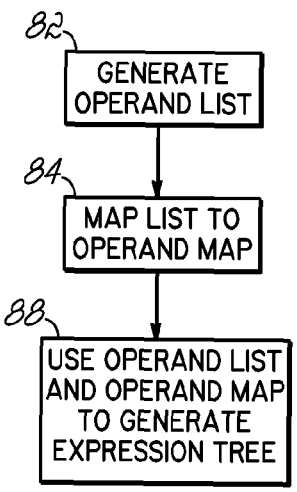
FIG. 12 is a flowchart showing an exemplary sequence of operations performed by a routine for building an expression database object using the database management system of FIG. 1.
Figure 13:
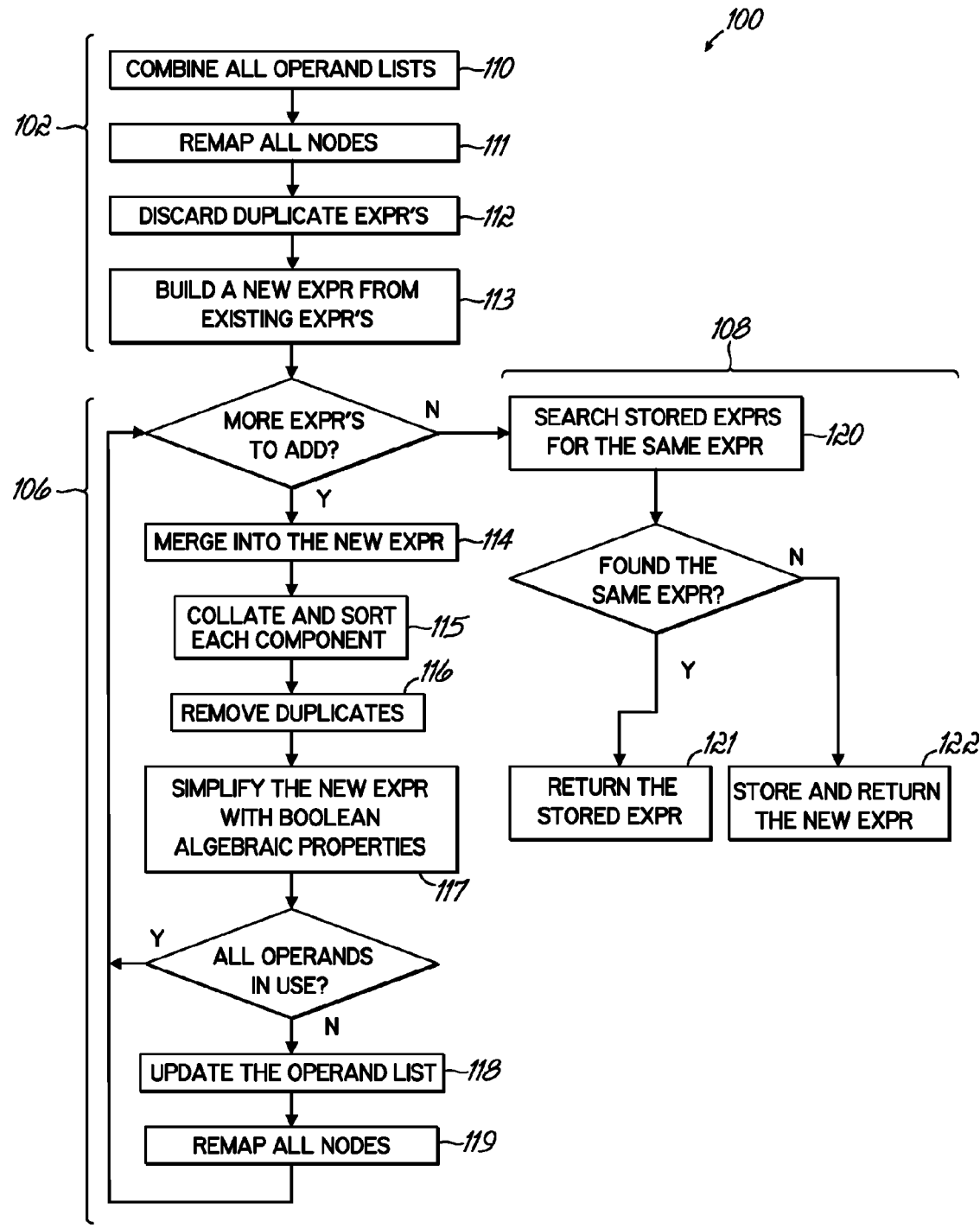
FIG. 13 is a flowchart showing an exemplary sequence of operations performed by a routine for constructing and optimizing an expression database object using the database management system of FIG. 1.

Having described the specific structure associated with an expression tree object, the description will now turn to the optimization process for the expression tree, which is associated with the query optimizer 42. An expression tree may be generated by a routine 80 as shown in FIG. 12, and capable of being executed by optimizer 42. In step 82, an operand list is generated, with each predicate assigned a unique identification number (UID) as explained above. In step 84, the operand list generated in step 82 is used to form an operand map which, as explained above and detailed below, may be a bit map with operands mapped to binary values. Alternatively, an operand map may be in any form within the DBMS suitable for performing the purpose described. Then, in step 88, an expression tree 60 is built using the operands listed and the bit map from the earlier steps 82 and 84. FIG. 13 shows the process flow of a routine 100 capable of being executed by the optimizer 42 as part of the process of building the tree 60.

In general, the optimizer 42 transforms the query into a query graph, and evaluates the cost for each branch of the query graph. As a part of the initial evaluation process 102, an operand is constructed for each predicate in the expression, then multiple operands are connected together to make up components within each branch of the query graph, and finally these components are connected together to represent each branch. For example, for a query: SELECT * FROM TABLE1 WHERE (C1=2 AND C2<4 AND C3>6) OR (C1=3 AND C2<5 AND C3>7), the optimizer first builds operands A, B, C, D, E, and F for predicates C1=2, C2<4, C3>6, C1=3, C2<5, and C3>7, respectively, then expressions for (A AND B AND C), (D AND E AND F), and finally (A AND B AND C) OR (D AND E AND F). The internal representation of an expression includes an operand list, which is a list of operands sorted by the unique ID number assigned for each operand at the time it is constructed to represent a predicate, and the expression tree, which describes the logical relations between these operands. To build a new expression, the optimizer calls program code with a list of existing expressions (or predicates) and a logical operator that is used to connect them. The program code goes through the following steps to transform the expressions in the list into a new expression in order to obtain a consistent and the most concise representation of the expression. The program combines all of the operand lists into one operand list by sorting each operand by its unique ID number (step 110). Nodes are then remapped to reflect the new operand list (step 111). Once duplicate expressions are discarded (step 112), the program code constructs a new operand tree with the first expression in the expression list using the aggregated operand list that reflects each operand's new position (step 113). Once this is complete, additional expressions are added in order as shown in the loop 106 in FIG. 13. One expression is combined with the current expression (step 114), after which the components are sorted at each level to facilitate comparisons (step 115). In one example, the program sorts each component of the operand tree at each level based on the binary equivalent value of the comprising nodes in ascending order. All the nodes are sorted within each set first, then all the sets within each group, and so on, making sure that the sorting of groups and blocks does not change the logical relations between them. Duplicate nodes, sets, groups, or blocks are removed from the tree as recognized, and the operand list is also reorganized to reflect the change (step 116).

As shown in step 117 of the flowchart of FIG. 13, all of the components at each level (e.g., nodes within each set, groups within each block) are compared to detect and remove redundancies by applying the Boolean algebraic properties such as associativity, commutativity, distributivity, absorption, idempotency, and complements, as shown in the table of FIG. 14. For example, an operand tree that signifies: (A AND B) OR (A AND B AND C) may be transformed into (A AND B), following the absorption property. An operand tree that signifies: (A or B) AND (A or C) AND (A or D) may be transformed into (A or (B and C and D)), resulting in two nodes total within a single set instead of six nodes with two nodes in each of three distinct sets.

The appropriate list of rules to apply may vary as known in the art. The applied rules, however, generally meet the condition of logical equivalency. The expression after simplification should be the same database query as before, in that the database query search with either expression should return identical results. Additionally, the applied rules should also tend toward simplicity. Applying the rules should tend to reduce the computational and structural complexity of the expression as recognized by one of skill in the art. For the applied rules to be understood as "simplifying", rather than "modifying", the expression, these two requirements of logical equivalency and simplicity should hold. After simplifying the expression, some operands may no longer be in use. If this occurs, the operand list is also reorganized to reflect removed operands (step 118), and the nodes are remapped accordingly (step 119).

As part of the combining of expressions, component expressions with special types are evaluated to determine if the special type is lost by the combination. For example, an expression tree with TYPE_AND combined with another expression tree might result in a tree without any special type. Additionally, each resultant tree is be evaluated to see if any of the special types apply, and converted to a special type if possible.

As shown at 108 in FIG. 13, once the expression is built, the newly built expression is compared against the other, already stored expressions for the query (step 120). In one embodiment, because the program code used to build each expression tree uses an organized routine 100 that produces a predictable result, a newly built expression appears the same as an equivalent stored expression. In this embodiment, if the two expressions are logically and functionally equivalent, undergoing this process will result in the two trees being recognizably equivalent by the program code. If an equivalent tree is found, the stored expression may be returned to the optimizer instead of the newly built expression (step 121). If not, the new expression may be stored and returned (step 122).

Part of the search optimization procedure requires an estimation of the selectivity of the expression. Selectivity can be estimated for an expression by breaking the expression up into intersections to form subset expressions, evaluating the results of available selectivity calculations for the subset expressions, and applying these results to estimate the selectivity of the expression as a whole.

In this embodiment of an expression tree, predicates of a node are implicitly AND-ed, nodes within a set are implicitly OR-ed, and sets within a group are implicitly AND-ed. Thus, the nodes within a set already form a list of intersections. To form an intersection list for an expression, intersections from the sets within a group are distributed over each other to derive intersections for the group. When a block contains more than one group, these groups are processed one at a time in the order they appear (i.e., from left to right), and intersections from each group are either added to the existing list for the OR-ed group or distributed over existing members of the list for the AND-ed group. If the expression tree contains more than one block, intersections from each block are merged into the existing list in the same manner as groups.

For example, a complicated tree for ((A and (B or C)) or (D or E)) and F has three groups (i.e., [(A(B C)) OR((D E)) AND((F))]). The first group (A(B C)) results in simple intersections [AB, AC]. The second group OR((D E)) results in [D, E]. Since its operation is OR, this set is appended to the set from the first group to produce [AB, AC, D, E]. Finally, the third group AND((F)) results in [F]. Since its operation is AND, this set is distributed over the accumulated list to produce [ABF, ACF, DF, EF].

Thus, creating a list of simple intersections from an expression tree is straightforward when no negated predicates are included. Similarly, a tree with negated predicates results in discrete intersections. In general, intersections that are OR-ed together are appended to one another while AND-ed intersections are distributed over each other. The rules become more complicated when more than one block with both simple and discrete intersections are involved. The rules for properly generating the intersections when each component expression includes only a simple or a discrete intersection are shown on the table of FIG. 15. Note that S1 and D1 denote simple and discrete intersections from Expression 1, S2 and D2 denote simple and discrete intersections from Expression 2, and S3 and D3 denote the resulting simple and discrete intersections. Also a plus sign (+) denotes aggregation and an asterisk (*) distribution.

Given these rules, the following formula signifies how the intersections of two blocks with both simple and discrete intersections may be combined:

OR:

$S3=S1$ or $S2=S1+S2$ $D3=D1$ or $D2=D1*\text{scope}(D2)+\text{scope}(D1)*D2-\text{explode}(S3)$

AND:

$S3=S1$ and $S2=S1*S2$ $D3=S1$ and $D2+S2$ and $D1+D1$ and $D2=\text{explode}(S1)*D2+\text{explode}(S2)*D1+D1*D2-\text{explode}(S3)$ The following examples demonstrate how simple and discrete intersections are obtained using these formulas.

For the expression "A and (B or C) and ˆD", an expression tree [((A) (B C)) AND-NOT((D))] of three groups results. The first group ((A) (B C)) is evaluated. Since it consists of two sets, the node in the first set is distributed over the two nodes in the second set, resulting in two simple intersections: [AB, AC], or S1=[x011, x101]. Note that four bits are required in each intersection since there are four predicates in the expression but the first bit is denoted with x for this group since it is outside of its scope. There are no discrete intersections for this group. The second group AND-NOT((D)) is evaluated to produce no simple intersection and one discrete intersection: D2=[0xxx]. The second group is AND-ed to the first group; therefore the result of the first group is distributed over the second group. Since the second group has a discrete intersection but the first group does not, simple intersections from the first group, S1=[x011, x101], are transformed to become discrete intersections: D1=discrete(S1)=[x001, x101, x111]. The result is then distributed over the discrete intersection from the second group: D2=[0xxx], to produce final discrete intersections: D3=D1*D2=[x011, x101, x111]*[0xxx]=[0011, 0101, 0111].

In evaluating the expression "(A and ˆB) or (C and ˆD)", an expression tree of two blocks results: [((A)) AND-NOT((B))] [OR((C)) AND-NOT((D))]. Evaluating the first block [((A)) AND-NOT((B))] results in one discrete intersection: D1=[xx01]. Evaluating the second block [OR((C)) AND-NOT((D))] results in one discrete intersection: D2=[01xx]. Apply the OR conjunction to two discrete intersections by transforming each intersection to fully cover the scope of two groups together: D1*scope(D2)=[xx01]*scope([01xx])=[xx01]*[00xx, 01xx, 10xx, 11xx]=[0001, 0101, 1001, 1101] and scope(D1)*D2=scope([xx01])*[01xx]=[xx00, xx01, xx10, xx11]*[00xx]=[0100, 0101, 0110, 0111]. Finally, in combining the expanded sets of intersections together in ascending order while removing the duplicates, we now have: D3=[0001, 0100, 0101, 0110, 0111, 1001, 1101].

In evaluating the expression "(A or ˆB) or (C or ˆD)", there are again two blocks [((A)) OR-NOT((B))] [OR((C)) OR-NOT((D))]. The expression (A or ˆB) has one simple intersection: [A], or S1 [xxx1], and one discrete intersection: [^A^B], or D1=[xx00]. The expression (C or ^D) has one simple intersection: [C], or S2=[x1xx], and one discrete intersection (^C^D), or D2=[00xx]. When these two expressions are OR-ed together, OR-ing two simple intersections S1 and S2 results in two simple intersections, S3=S1+S2=[0001, 0100]. OR-ing of two discrete intersections requires additional steps for having to take the scope of the other intersection into consideration, as explained above. The first discrete intersection taken over the scope of the second results in D1*scope(D2)=[xx00]*scope([00xx])=[xx00]*[00xx, 01xx, 10xx, 11xx]=[0000, 0100, 1000, 1100]. The first over the scope of the second results in scope(D1)*D2=scope ([xx00])*[00xx]=[xx00, xx01, xx10, xx 11]*[00xx]=[0000, 0001, 0010, 0011]. Because the expressions are OR-ed, the results are then combined together: [0000, 0001, 0010, 0011, 0100, 1000, 1100]. From the combined discrete intersections, the intersections already accounted for by the simple intersections are removed: D3=[0000, 0001, 0010, 0011, 0100, 1000, 1100]–discrete(S3)=[0000, 0001, 0100].

As the expression becomes more complex, the number of intersections for the expression may become too numerous to process within a reasonable amount of time. A goal is to minimize the optimization time overhead while maintaining the accuracy of the selectivity estimate. In such cases, a subset of intersections may be selected and evaluated to estimate the selectivity of the expression. This subset may be generated by a tiered methodology in dependence upon the calculated selectivity rating of the intersections. One such methodology for selecting an appropriate subset for sample-based projected selectivity is found in U.S. patent application Ser. No. 11/690,156, filed Mar. 23, 2007 and assigned to the assignee of the present application, the entirety of which is hereby incorporated by reference.

FIGS. 16 and 17A-17C illustrate an example of the use of expression trees in optimizing and running a database query. Here, the query shown in FIG. 16 is to be run against a phone directory database. The optimizer builds up three expression trees whose layouts 670a, 670b, 670c are shown in FIGS. 17A-17C. The data structure 670a shown in FIG. 17A represents a table scan plan of the entire phone directory; its operand map uses all four predicates. The data structure 670b shown in FIG. 17B represents an index probe on "CITY", using only one predicate of the query (CITY='Rochester'). The data structure 670c shown in FIG. 17C represents an index probe on "LAST_NAME", using two predicates from the query (LAST_NAME='Suginaka', LAST_NAME='Faunce').

The optimizer compares the three generated expressions, calculating their selectivity as described above and known in the art, to determine that the index probe on "LAST_NAME", as illustrated by FIG. 17C, is the most efficient process to carry out the desired database query. The program code uses this optimized approach in querying the telephone directory.

While the present invention has been illustrated by a description of various embodiments and while these embodiments have been described in considerable detail, the applicant does not intend to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of representing a database query expression for use during execution of the query expression by a computer, wherein the database query expression includes a plurality of predicates related to one another by at least one logical relation, the method comprising:

generating a plurality of operands from the database query expression, wherein each operand in the plurality of operands is representative of a predicate in the plurality of predicates;

assigning each operand in the plurality of operands to a separate bit in a binary operand map, the number of bits in the binary operand map based upon the number of predicates in the expression;

generating an expression tree data structure based upon the generated plurality of operands, wherein the expression tree includes a plurality of nodes, wherein each node includes an operand identifier comprising a binary value that includes a bit set for each operand identified by the operand identifier according to the binary operand map, wherein each node defines a first logical relation between those predicates in the database query expression that are represented by operands identified by the operand identifier for such node, and wherein the plurality of nodes are arranged relative to one another in the data structure to define at least a second logical relation among predicates in the database query expression, wherein the expression tree includes a header, the header including a number of predicates in the tree and whether the tree is a special type, wherein the expression tree further includes at least one set, at least one group, and at least one block, wherein the tree is hierarchical such that each set includes at least one node and is associated with exactly one group, and each group includes at least one set and is associated with exactly one block, and each block includes at least one group, and wherein the expression tree implicitly represents relations such that the elements in each node are implicitly represented by "AND" relation, the nodes in a set are implicitly represented by "OR" relation, and the sets in a group are implicitly represented by "AND" relation without data in the data structure explicitly conveying these relations, wherein the expression tree includes a directory with a plurality of directory entries, and wherein each directory entry describes one group or describes one set, wherein the expression tree further includes a data area wherein the operand identifiers of the nodes are stored, the directory entries identifying which set and which group are associated with each node, and wherein the expression tree is simplified by:
sorting the expression tree according to relation-preserving rules such that the operands and operations of the expression are represented according to a well-defined and predictable order; and
applying a set of rules to the sorted expression tree, the rules comprising a list of transformations that preserve the logical relationships represented by the expression tree.

2. A method of representing a database query expression for use during execution of the query expression by a computer, wherein the database query expression includes a plurality of predicates related to one another by at least one logical relation, the method comprising:

generating a plurality of operands from the database query expression, wherein each operand in the plurality of operands is representative of a predicate in the plurality of predicates;

mapping each operand among the plurality of operands into an operand map; and generating a hierarchical data structure based upon the generated plurality of operands, wherein the data structure includes a plurality of nodes, wherein each node includes an operand identifier that identifies at least one operand from the plurality of operands based upon the operand map, wherein each node defines a first logical relation between those predicates in the database query expression that are represented by operands identified by the operand identifier for such node, and wherein the plurality of nodes are arranged relative to one another in the data structure within multiple hierarchical levels to define at least a second logical relation among predicates in the database query expression.

3. The method of claim 2, wherein mapping each operand in the plurality of operands into the operand map comprises assigning each operand in the plurality of operands to a separate bit in a binary operand map, and wherein the operand identifier for a node comprises a binary value that includes a bit set for each operand identified by the operand identifier according to the binary operand map.

4. The method of claim 2, wherein the data structure comprises a tree, the tree comprising at least one level.

5. The method of claim 2, wherein the plurality of operands, the operand map, and the data structure represent a disjunctive normal form of the database query expression.

6. The method of claim 2, wherein the plurality of operands comprises an ordered list of operands, and wherein the order of operands identified by the operand identifier corresponds to the order of the operands in the list of operands.

7. The method of claim 3, wherein a number of bits in the binary operand map is based upon a number of predicates in the expression.

8. The method of claim 3, wherein a number of bits in the operand identifier is based upon a number of predicates in the expression.

9. The method of claim 4, wherein the tree includes a header, the header including at least one of the following: a number of predicates in the tree, whether the tree is a special type, at least one counter, and combinations thereof.

10. The method of claim 4, wherein the data structure comprises a tree, the tree comprising at least one set, at least one group, and at least one block, wherein the tree is hierarchical such that each set includes at least one node and is associated with exactly one group, and each group includes at least one set and is associated with exactly one block, and each block includes at least one group.

11. The method of claim 10, wherein the tree includes a directory with a plurality of directory entries, and wherein each directory entry describes one group or describes one set.

12. The method of claim 11, wherein the tree further includes a data area wherein the operand identifiers of the nodes are stored, the directory entries identifying which set and which group are associated with each node.

13. The method of claim 2, wherein the step of generating the data structure further comprises simplifying the data structure by:

sorting the data structure according to relation-preserving rules such that the operands and operations of the data structure are represented according to a well-defined and predictable order;

applying a set of rules to the sorted data structure, the rules comprising a list of transformations that preserve the logical relationships represented by the data structure.

14. An apparatus comprising:

a processor; and program code configured to be executed by the processor to represent a database query expression for use during execution of the query expression by a computer, wherein the database query expression includes a plurality of predicates related to one another by at least one logical relation, the program code configured to generate a plurality of operands from the database query expression, wherein each operand in the plurality of operands is representative of a predicate in the plurality of predicates;

the program code further configured to map each operand among the plurality of operands into an operand map; and the program code further configured to generate a hierarchical data structure based upon the generated plurality of operands, wherein the data structure includes a plurality of nodes, wherein each node includes an operand identifier that identifies at least one operand from the plurality of operands based upon the operand map, wherein each node defines a first logical relation between those predicates in the database query expression that are represented by operands identified by the operand identifier for such node, and wherein the plurality of nodes are arranged relative to one another in the data structure within multiple hierarchical levels to define at least a second logical relation among predicates in the database query expression.

15. The apparatus of claim 14, wherein the program code is further configured such that mapping each operand in the plurality of operands into the operand map comprises assigning each operand in the plurality of operands to a separate bit in a binary operand map, and wherein the operand identifier for a node comprises a binary value that includes a bit set for each operand identified by the operand identifier according to the binary operand map.

16. The apparatus of claim 14, wherein the data structure comprises a tree, the tree comprising at least one level.

17. The apparatus of claim 14, wherein the plurality of operands, the operand map, and the data structure represent a disjunctive normal form of the database query expression.

18. The apparatus of claim 14, wherein the plurality of operands comprises an ordered list of operands, and wherein the order of operands identified by the operand identifier corresponds to the order of the operands in the list of operands.

19. The apparatus of claim 15, wherein a number of bits in the operand identifier is based upon a number of predicates in the expression.

20. The apparatus of claim 16, wherein the tree generated by the program code includes a header, the header including at least one of the following: a number of predicates in the tree, whether the tree is a special type, at least one counter, and combinations thereof.

21. The apparatus of claim 16, wherein the data structure generated by the program code comprises a tree, the tree comprising at least one set, at least one group, and at least one block, wherein the tree is hierarchical such that each set includes at least one node and is associated with exactly one group, and each group includes at least one set and is associated with exactly one block, and each block includes at least one group.

22. The apparatus of claim 21, wherein the tree includes a directory with a plurality of directory entries, and wherein each directory entry describes one group or describes one set.

23. The apparatus of claim 22, wherein the tree further includes a data area wherein the operand identifiers of the nodes are stored, the directory entries identifying which set and which group are associated with each node.

24. The apparatus of claim 14, wherein the program code is further configured to simplify the data structure by sorting the data structure according to relation-preserving rules such that the operands and operations of the data structure are represented according to a well-defined and predictable order; and applying a set of rules to the sorted data structure, the rules comprising a list of transformations that preserve the logical relationships represented by the data structure.

25. A program product, comprising:

a non-transitory computer readable medium; and program code stored on the computer readable medium and configured to represent a database query expression, wherein the database query expression includes a plurality of predicates related to one another by at least one logical relation, the program code configured to generate a plurality of operands from the database query expression, wherein each operand in the plurality of operands is representative of a predicate in the plurality of predicates;

the program code further configured to map each operand among the plurality of operands into an operand map; and the program code further configured to generate a hierarchical data structure based upon the generated plurality of operands, wherein the data structure includes a plurality of nodes, wherein each node includes an operand identifier that identifies at least one operand from the plurality of operands based upon the operand map, wherein each node defines a first logical relation between those predicates in the database query expression that are represented by operands identified by the operand identifier for such node, and wherein the plurality of nodes are arranged relative to one another in the data structure within multiple hierarchical levels to define at least a second logical relation among predicates in the database query expression.

26. The method of claim 2, wherein the data structure further comprises a directory that describes an arrangement of the plurality of nodes within the multiple hierarchical levels.

27. The method of claim 2, wherein the multiple hierarchical levels include a set level and a group level, wherein the data structure includes a plurality of groups and a plurality of sets, wherein each group contains at least one set among the plurality of groups, and wherein each set contains at least one node from among the plurality of nodes.

* * * * *